US010858539B2

(12) United States Patent
Bae et al.

(10) Patent No.: US 10,858,539 B2
(45) Date of Patent: Dec. 8, 2020

(54) SILOXANE HARD-COATING RESIN COMPOSITION

(71) Applicant: KOREA ADVANCED INSTITUTE OF SCIENCE AND TECHNOLOGY, Daejeon (KR)

(72) Inventors: Byeong-Soo Bae, Daejeon (KR); Ji-Hoon Ko, Daejeon (KR); Gwang-Mun Choi, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 122 days.

(21) Appl. No.: 15/939,547

(22) Filed: Mar. 29, 2018

(65) Prior Publication Data

US 2018/0215949 A1 Aug. 2, 2018

Related U.S. Application Data

(60) Continuation-in-part of application No. 15/424,962, filed on Feb. 6, 2017, now abandoned, which is a division of application No. 14/567,703, filed on Dec. 11, 2014, now Pat. No. 9,598,609, which is a continuation of application No. PCT/KR2013/005208, filed on Jun. 12, 2013.

(30) Foreign Application Priority Data

Jun. 12, 2012 (KR) .................. 10-2012-0062846
Jun. 11, 2013 (KR) .................. 10-2013-0066550

(51) Int. Cl.
| | | |
|---|---|---|
| C08K 5/1535 | (2006.01) | |
| C09D 183/06 | (2006.01) | |
| C08G 59/42 | (2006.01) | |
| C09D 163/00 | (2006.01) | |
| C08L 83/04 | (2006.01) | |
| C08K 5/1525 | (2006.01) | |
| C08J 7/04 | (2020.01) | |
| C08G 77/14 | (2006.01) | |

(52) U.S. Cl.
CPC .......... *C09D 183/06* (2013.01); *C08G 59/42* (2013.01); *C08J 7/0427* (2020.01); *C08K 5/1525* (2013.01); *C08K 5/1535* (2013.01); *C08L 83/04* (2013.01); *C09D 163/00* (2013.01); *C08G 77/14* (2013.01); *C08J 2483/06* (2013.01); *Y10T 428/31663* (2015.04)

(58) Field of Classification Search
CPC ..... C07F 7/182; C08K 5/5419; C08K 5/1545; C08K 5/1515
See application file for complete search history.

(56) References Cited

U.S. PATENT DOCUMENTS

| | | |
|---|---|---|
| 6,090,890 A | 7/2000 | Murakami |
| 7,329,715 B2 | 2/2008 | Wang et al. |
| 9,598,609 B2 | 3/2017 | Bae |
| 9,617,449 B2 | 4/2017 | Bae |
| 2009/0269504 A1 | 10/2009 | Liao |
| 2012/0034450 A1 | 2/2012 | Morita et al. |
| 2016/0152866 A1* | 6/2016 | Woo ............... C09D 183/06 345/173 |
| 2018/0355175 A1* | 12/2018 | Han ................... C08J 5/18 |
| 2019/0233594 A1* | 8/2019 | Furukawa ......... C08G 77/44 |

FOREIGN PATENT DOCUMENTS

| | | |
|---|---|---|
| CN | 101068845 | 11/2007 |
| CN | 101213257 | 7/2008 |
| CN | 102419515 | 4/2012 |
| JP | 61-293232 | 12/1986 |
| JP | 2006-063244 | 3/2006 |
| JP | 2007-009080 | 1/2007 |
| JP | 2007-063325 | 3/2007 |
| JP | 2007-217704 | 8/2007 |
| JP | 2011-132416 | 7/2011 |
| KR | 10-2008-0031339 | 4/2008 |
| KR | 10-2011-0129587 | 2/2011 |
| KR | 10-2011-0074677 | 7/2011 |
| KR | 10-2012-0030012 | 3/2012 |
| KR | 10-1147971 | 5/2012 |
| TW | 200619273 | 6/2006 |
| TW | 201118115 | 6/2011 |
| TW | 201132699 | 10/2011 |
| TW | 201211160 | 3/2012 |
| WO | 2011/084250 | 7/2011 |
| WO | 2012/008498 | 1/2012 |

OTHER PUBLICATIONS

KIPO, International Search Report of PCT/KR2013/005208 dated Sep. 23, 2013.
EPO, European Search Report of EP 13804285.8 dated Oct. 22, 2015.
SIPO, Office Action of CN 201380031082.X dated Nov. 16, 2015.
USPTO, Office Action of U.S. Appl. No. 15/424,962 dated Sep. 27, 2017.

* cited by examiner

*Primary Examiner* — Kuo Liang Peng
(74) *Attorney, Agent, or Firm* — Lex IP Meister, PLLC

(57) ABSTRACT

The present disclosure provides a hard-coating resin composition for a hard-coating having easy processability, flexibility and high surface hardness suitable for a hard-coating agent, in which a siloxane molecule having an inorganic material characteristic is chemically bonded with an epoxy group having an organic material characteristic to form one molecule, and the siloxane molecule is made to contain a various molecular weight distribution for dense crosslinking during polymerization of the epoxy group in order to obtain high surface hardness due to the inorganic material.

14 Claims, No Drawings

US 10,858,539 B2

SILOXANE HARD-COATING RESIN COMPOSITION

CROSS-REFERENCE TO RELATED APPLICATION

This application is a Continuation-In-Part application of U.S. patent application Ser. No. 15/424,962 filed on Feb. 6, 2017 which is a divisional application of U.S. patent application Ser. No. 14/567,703 filed Dec. 11, 2014, which is a continuation of International Patent Application No. PCT/KR2013/005208 filed on Jun. 12, 2013, claiming priority based on Korean Patent Application No. 10-2012-0062846 filed on Jun. 12, 2012 and Korean Patent Application No. 10-2013-0066550 filed on Jun. 11, 2013, the contents of all of which are incorporated herein by reference in their entirety.

TECHNICAL FIELD

The embodiments described herein pertain generally to a hard-coating resin composition including a siloxane resin, a method of preparing a siloxane cured hard-coating article using the hard-coating resin composition, an optical film or sheet including the siloxane cured hard-coating article, and a device such as a display unit including the optical film or sheet including the siloxane cured hard-coating article.

BACKGROUND

Transparent plastics have been widely used as a core material in optical and transparent display industries. In particular, transparent plastics such as PC (polycarbonate) or PMMA (polymethyl methacrylate) or PET (Polyethylene terephthalate) have been applied in displays, optical lens, transparent boards of large buildings, and automotive industries as a lightweight alternative to conventional glass due to its advantageous properties of high light transmittance, shatter-resistance and high-refractive index. In addition, recently, colorless PI (polyimide) film is considered as cover window plastic film for flexible displays. However, these plastic resins have a drawback of low abrasion resistance, since they have lower surface hardness than glass. In order to overcome this drawback, it is rising as an important issue to develop a hard-coating technology for improving the surface hardness of plastics with maintaining the flexibility of them.

Materials used in hard-coating technologies resin are largely divided into organic, inorganic, and organic-inorganic hybrid materials. Organic materials such as acryl, urethane, melamine, etc. have advantages of organic materials such as flexibility and processability, but they have low surface hardness. In contrast, silicon-based inorganic materials have the properties of high surface hardness and transparency, but they have low flexibility and processability. Since hard-coating technology requires the advantages of both of these materials, using an organic-inorganic hybrid material has been attracting more attention than using either one of them. However, even though many studies have been actively made to integrate the benefits of both organic and inorganic materials into the hard-coating technology, they are still unsatisfactory.

In the conventional technologies, Japanese Patent Laid-open Publication No. 2006-063244 discloses a resin composition for hard-coating, which is composed of colloidal silica surface-treated with a silane coupling agent having a reactive (meth)acrylate group in its molecule, a monomer having one reactive (meth)acrylate group in its molecule or a polymer prepared by polymerization of this monomer, a bifunctional (meth)acrylate, a tri- or higher multi-functional (meth)acrylate, a leveling agent, and a photo-polymerization initiator. However, photo-radical polymerization of acrylate is sensitive to oxygen, unlike polymerization of epoxy group. Thus, when it is intended to obtain a cured hard-coating article using a photo-radical polymerization of acrylate, inert gas atmosphere should be maintained, which is regarded as a disadvantage.

Meanwhile, US Patent Laid-open Publication No. 2012-0034450 discloses a surface protection film, which can be obtained by mixing an ionizing radiation curable resin, a matting agent, an ultraviolet ray absorbing agent, and inorganic fine particles subjected to hydrophobization treatment to thereby prepare a resin, and then curing the resin. However, physical mixing of the ionizing radiation curable resin with the inorganic fine particles may decrease dispersibility and cause aggregation of inorganic fine particles. Transmittance is also decreased due to light scattering caused by the interface between the resin and the inorganic fine particles. Therefore, this film is not suitable for optical protection films.

Accordingly, it is expected that development of hard-coating materials with easy processability and flexibility of organic materials and high light transmittance and surface hardness of inorganic materials will be an essential technology for a wide range of applications of plastics.

DETAILED DESCRIPTION OF THE INVENTION

Problems to be Solved by the Invention

The present disclosure provides a hard-coating resin composition for a hard-coating having easy processability, flexibility and high surface hardness suitable for a hard-coating agent, in which a siloxane molecule having an inorganic material characteristic is chemically bonded with an epoxy group having an organic material characteristic to form one molecule, and the siloxane molecule is made to contain a various molecular weight distribution for dense crosslinking during polymerization of the epoxy group in order to obtain high surface hardness due to the inorganic material, unlikely in the conventional technique of physically mixing silica particles in an organic resin. Therefore, the present disclosure provides a hard-coating resin composition including a siloxane resin, a method of preparing a siloxane cured hard-coating article using the hard-coating resin composition, an optical film or sheet including the siloxane cured hard-coating article, and a device such as a display unit including the optical film or sheet including the siloxane cured hard-coating article.

However, the problems sought to be solved by the present disclosure are not limited to the above description and other problems can be clearly understood by those skilled in the art from the following description.

Means for Solving the Problems

The first aspect of the present disclosure provides a hard-coating resin composition including a siloxane resin containing an epoxy group, wherein the siloxane resin consists of epoxy-siloxane molecules with various molecular weights which leads to densely crosslinked networks, wherein the siloxane resin is prepared by hydrolysis and/or condensation of (i) a silane represented by the following Chemical Formula 1 including an epoxy group, or (ii) the silane represented by the following Chemical Formula 1 including an epoxy group and at least one selected from the group consisting of a silane represented by the following Chemical Formula 2, a silane represented by the following Chemical Formula 3 and a silane represented by the following Chemical Formula 4 in the presence of a catalyst:

$$R^1R^2Si(OR^3)_2 \quad \text{[Chemical Formula 1]}$$

$$R^4R^5Si(OR^6)_2 \quad \text{[Chemical Formula 2]}$$

$$R^7Si(OR^8)_3 \quad \text{[Chemical Formula 3]}$$

$$Si(OR^9)_4; \quad \text{[Chemical Formula 4]}$$

wherein $R^1$ is a straight or branched $C_1$ to $C_6$ alkyl group including an epoxy group, $R^2$, $R^4$, $R^5$, and $R^7$ are independently selected from the group consisting of a straight or branched $C_1$ to $C_6$ alkyl group including an epoxy group, a $C_1$ to $C_{20}$ alkyl group, a $C_3$ to $C_8$ cycloalkyl group, a $C_2$ to $C_{20}$ alkenyl group, a $C_2$ to $C_{20}$ alkynyl group, a $C_6$ to $C_{20}$ aryl group, an acryl group, a methacryl group, a halogen group, an amino group, a mercapto group, an ether group, an ester group, a carbonyl group, a carboxyl group, a vinyl group, a nitro group, a sulfone group, an alkyd group, a hydroxyl group, an imide group, a fluorine group, and an UV absorbing group, $R^3$, $R^6$, $R^8$, and $R^9$ are independently hydrogen or a straight or branched $C_1$ to $C_7$ alkyl group; and wherein a mole ratio of the silane represented by Chemical Formula 1 to the total silanes is in the range of from 0.6 to 1, a mole ratio of the silane represented by Chemical Formula 2 to the total silanes is in the range of from 0 to 0.4, a mole ratio of the silane represented by Chemical Formula 3 to the total silanes is in the range of from 0 to 0.3 and a mole ratio of the silane represented by Chemical Formula 4 to the total silanes is in the range of from 0 to 0.2.

Thus, the present disclosure provides a siloxane cured hard-coating article having high hardness with good flexibility inward and outward, but may not be limited thereto.

In accordance with a second aspect of the present disclosure, there is provided a method of preparing a cured hard-coating article, including a polymerization of the hard-coating resin composition of the first aspect of the present disclosure.

In accordance with a third aspect of the present disclosure, there is provided a cured hard-coating article, including the hard-coating resin composition of the first aspect of the present disclosure.

In accordance with a fourth aspect of the present disclosure, there is provided an optical film, comprising the cured hard-coating article of the third aspect of the present disclosure.

In accordance with a fifth aspect of the present disclosure, there is provided a device, comprising the optical film of the fourth aspect of the present disclosure.

Effect of the Invention

In view of the foregoing problems, the present disclosure provides a hard-coating resin composition for a hard-coating having easy processability, flexibility and high surface hardness suitable for a hard-coating agent, in which a siloxane molecule having an inorganic material characteristic is chemically bonded with an epoxy group having an organic material characteristic to form one molecule, and the siloxane molecule is made to contain a various molecular weight distribution for dense crosslinking during polymerization of the epoxy group in order to obtain high surface hardness due to the inorganic material, unlikely in the conventional technique of physically mixing silica particles in an organic resin. The hard-coating resin composition of the present disclosure can be used for cured hard-coating article having good hardness with flexibility under inward and outward bending conditions, which makes the hard-coating resin composition very useful for applying it to various flexible devices or displays. The present disclosure provides a cured hard-coating article using the hard-coating resin composition and an optical film or sheet including the cured hard-coating article. The present disclosure provides a device such as a display unit, comprising the optical film of the fourth aspect of the present disclosure.

BEST MODE FOR CARRYING OUT THE INVENTION

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

The first aspect of the present disclosure provides a hard-coating resin composition including a siloxane resin containing an epoxy group, wherein the siloxane resin consists of epoxy-siloxane molecules with various molecular weights which leads to densely crosslinked networks, wherein the siloxane resin is prepared by hydrolysis and/or condensation of (i) a silane represented by the following Chemical Formula 1 including an epoxy group, or (ii) the silane represented by the following Chemical Formula 1 including an epoxy group and at least one selected from the group consisting of a silane represented by the following Chemical Formula 2, a silane represented by the following Chemical Formula 3 and a silane represented by the following Chemical Formula 4 in the presence of a catalyst:

$$R^1R^2Si(OR^3)_2 \quad \text{[Chemical Formula 1]}$$

$$R^4R^5Si(OR^6)_2 \quad \text{[Chemical Formula 2]}$$

$$R^7Si(OR^8)_3 \quad \text{[Chemical Formula 3]}$$

$$Si(OR^9)_4; \quad \text{[Chemical Formula 4]}$$

wherein $R^1$ is a straight or branched $C_1$ to $C_6$ alkyl group including an epoxy group, $R^2$, $R^4$, $R^5$, and $R^7$ are independently selected from the group consisting of a straight or branched $C_1$ to $C_6$ alkyl group including an epoxy group, a $C_1$ to $C_{20}$ alkyl group, a $C_3$ to $C_8$ cycloalkyl group, a $C_2$ to $C_{20}$ alkenyl group, a $C_2$ to $C_{20}$ alkynyl group, a $C_6$ to $C_{20}$ aryl group, an acryl group, a methacryl group, a halogen group, an amino group, a mercapto group, an ether group, an ester group, a carbonyl group, a carboxyl group, a vinyl group, a nitro group, a sulfone group, an alkyd group, a hydroxyl group, an imide group, a fluorine group, and an UV absorbing group, $R^3$, $R^6$, $R^8$, and $R^9$ are independently hydrogen or a straight or branched $C_1$ to $C_7$ alkyl group; and wherein a mole ratio of the silane represented by Chemical Formula 1 to the total silanes is in the range of from 0.6 to 1, a mole ratio of the silane represented by Chemical Formula 2 to the total silanes is in the range of from 0 to 0.4, a mole ratio of the silane represented by Chemical Formula 3 to the total silanes is in the range of from 0 to 0.3 and a mole ratio of the silane represented by Chemical Formula 4 to the total silanes is in the range of from 0 to 0.2.

Thus, the present disclosure provides a siloxane cured hard-coating article having high hardness with good flexibility inward and outward, but may not be limited thereto.

In accordance with a second aspect of the present disclosure, there is provided a method of preparing a cured hard-coating article, including a polymerization of the hard-coating resin composition of the first aspect of the present disclosure.

In accordance with a third aspect of the present disclosure, there is provided a cured hard-coating article, including the hard-coating resin composition of the first aspect of the present disclosure.

In accordance with a fourth aspect of the present disclosure, there is provided an optical film, comprising the cured hard-coating article of the third aspect of the present disclosure.

In accordance with a fifth aspect of the present disclosure, there is provided a device, comprising the optical film of the fourth aspect of the present disclosure.

Thus, the present disclosure provides a siloxane cured hard-coating article having high hardness with good flexibility inward and outward, but may not be limited thereto.

In accordance with the present disclosure, it is possible to provide a hard-coating resin composition in which a siloxane molecule having an inorganic material characteristic is chemically bonded with an epoxy group having an organic material characteristic, and the siloxane molecule is made to contain a various molecular weight distribution for dense crosslinking during polymerization of the epoxy group in order to obtain high surface hardness due to the inorganic material. This hard-coating resin composition has high processability, high flexibility and high surface hardness.

The hard-coating resin composition of the present disclosure can be used for cured hard-coating article having good hardness with flexibility under inward and outward bending conditions, which makes the hard-coating resin composition very useful for applying it to various flexible devices or displays.

The foregoing summary is illustrative only and is not intended to be in any way limiting. In addition to the illustrative aspects, embodiments, and features described above, further aspects, embodiments, and features will become apparent by reference to the drawings and the following detailed description.

Hereinafter, example embodiments will be described in detail so that inventive concept may be readily implemented by those skilled in the art.

However, it is to be noted that the present disclosure is not limited to the example embodiments but can be realized in various other ways. In the drawings, certain parts not directly relevant to the description are omitted to enhance the clarity of the drawings, and like reference numerals denote like parts throughout the whole document.

Through the present disclosure, the terms "connected to" or "coupled to" are used to designate a connection or coupling of one element to another element and include both a case where an element is "directly connected or coupled to" another element and a case where an element is "electronically connected or coupled to" another element via still another element.

Through the present disclosure, the term "on" that is used to designate a position of one element with respect to another element includes both a case that the one element is adjacent to the another element and a case that any other element exists between these two elements.

Throughout the whole document, the term "comprises" or "includes" and/or "comprising" or "including" used in the document means that one or more other components, steps, operations, and/or the existence or addition of elements are not excluded in addition to the described components, steps, operations and/or elements. The terms "about", "approximately" or "substantially" used in this document are intended to have meanings close to numerical values or ranges specified with an allowable error and intended to prevent accurate or absolute numerical values disclosed for understanding of the present invention from being illegally or unfairly used by any unconscionable third party. Through the whole document, the term "step of" does not mean "step for."

Through the present disclosure, the term "combinations thereof" included in Markush type description means mixture or combinations thereof one or more components, steps, operations and/or elements selected from the group consisting of components, steps, operation and/or elements described in Markush type and thereby means that the disclosure includes one or more components, steps, operations and/or elements selected from the Markush group.

Throughout the whole document, the description "A and/or B" means "A or B, or A and B."

Through the present disclosure, unless otherwise defined, the term "alkyl" means a straight-chain or branched-chain unsubstituted or substituted saturated hydro-carbon group, and may include methyl, ethyl, propyl, isopropyl, isobutyl, sec-butyl, tert-butyl, pentyl, hexyl, heptyl, octyl, nonyl, decyl, undecyl, tridecyl, pentadecyl and heptadecyl, but may not be limited thereto. Alkyl may include an alkyl group with an alkyl unit having a carbon number ranging from about 1 to about 30, which does not include a carbon number of a substitution product when $C_1$-$C_{30}$ alkyl is substituted.

Through the present disclosure, the term "alkoxy" means an alkyl group, as defined above, bonded to an oxygen atom, and may include a $C_1$-$C_{20}$ alkoxy group. By way of example, the alkoxy may include methoxy, ethoxy, propoxy, butoxy, pentoxy, hexyloxy, heptyloxy, octyloxy, nonyloxy, decyloxy and all of their possible isomers.

The first aspect of the present disclosure provides a hard-coating resin composition including a siloxane resin containing an epoxy group, wherein the siloxane resin consists of epoxy-siloxane molecules with various molecular weights which leads to densely crosslinked networks, wherein the siloxane resin is prepared by hydrolysis and/or condensation of (i) a silane represented by the following Chemical Formula 1 including an epoxy group, or (ii) the silane represented by the following Chemical Formula 1 including an epoxy group and at least one selected from the group consisting of a silane represented by the following Chemical Formula 2, a silane represented by the following Chemical Formula 3 and a silane represented by the following Chemical Formula 4 in the presence of a catalyst:

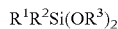  [Chemical Formula 1]

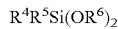  [Chemical Formula 2]

  [Chemical Formula 3]

  [Chemical Formula 4]

wherein $R^1$ is a straight or branched $C_1$ to $C_6$ alkyl group including an epoxy group, $R^2$, $R^4$, $R^5$, and $R^7$ are independently selected from the group consisting of a straight or branched $C_1$ to $C_6$ alkyl group including an epoxy group, a $C_1$ to $C_{20}$ alkyl group, a $C_3$ to $C_8$ cycloalkyl group, a $C_2$ to $C_{20}$ alkenyl group, a $C_2$ to $C_{20}$ alkynyl group, a $C_6$ to $C_{20}$ aryl group, an acryl group, a methacryl group, a halogen group, an amino group, a mercapto group, an ether group, an ester group, a carbonyl group, a carboxyl group, a vinyl group, a nitro group, a sulfone group, an alkyd group, a hydroxyl group, an imide group, a fluorine group, and an UV absorbing group, $R^3$, $R^6$, $R^8$, and $R^9$ are independently hydrogen or a straight or branched $C_1$ to $C_7$ alkyl group; and wherein a mole ratio of the silane represented by Chemical Formula 1 to the total silanes is in the range of from 0.6 to 1, a mole ratio of the silane represented by Chemical Formula 2 to the total silanes is in the range of from 0 to 0.4, a mole ratio of the silane represented by Chemical Formula 3 to the total silanes is in the range of from 0 to 0.3 and a mole ratio of the silane represented by Chemical Formula 4 to the total silanes is in the range of from 0 to 0.2.

The siloxane resin containing an epoxy group (or the epoxy-siloxane resin) has a weight-average molecular weight in the range of from about 1,000 to about 10,000 and a molecular weight distribution of PDI ranging from about 1.0 to about 3.0, through condensation reaction of silanes alone having an epoxy group or between silanes having an epoxy group with heterogeneous silanes. By way of non-limiting example, the weight-average molecular weight of the siloxane resin may be in the range of, e.g., from about 1,000 to about 10,000, from about 1,000 to about 6,000, from about 5,000 to about 10,000, from about 1,000 to about 4,000, from about 4,000 to about 7,000, or from about 7,000 to about 10,000. By way of non-limiting example, the siloxane resin may have a molecular weight distribution of PDI ranging, e.g., from about 1.0 to about 3.0, preferably from about 1.2 to about 2.8, or more preferably from about 1.5 to about 2.5. The weight-average molecular weight and PDI can be determined by gel permeation chromatography with a polystyrene standard at 25° C.

Further, owing to the properties of the epoxy group, the siloxane resin containing the epoxy group of the present disclosure exhibits no oxygen sensitivity upon polymerization, and is photo-curable or thermally curable depending on a polymerization initiator, and, thus, it shows high processability and flexibility.

Viscosity, curing rate and density of the siloxane resin and the properties of the cured hard-coating article, e.g., hardness, flexibility, adhesion, appearance and curl, can be controlled by adding a reactive monomer, such as an epoxy or oxetane monomer, which reacts with the epoxy group to form crosslinking, to the siloxane resin containing the epoxy group synthesized by the condensation reaction. Therefore, it is possible to provide an optimal siloxane hard-coating resin composition for the usage of the hard-coating agent.

Therefore, the siloxane hard-coating resin composition of the present disclosure has easy processability and flexibility of the epoxy group, and high surface hardness and transparency through dense crosslinking of the siloxane network due to the siloxane molecules containing various molecular weights.

The hard-coating resin composition of the present disclosure can be used for cured hard-coating article having good hardness with flexibility under inward and outward bending conditions, which makes the hard-coating resin composition very useful for applying it to various flexible devices or displays. The present disclosure provides a cured hard-coating article using the hard-coating resin composition and an optical film or sheet including the cured hard-coating article. The present disclosure provides a device such as a display unit, comprising the optical film of the fourth aspect of the present disclosure.

The siloxane resin in accordance with the present disclosure is prepared by hydrolysis and condensation reaction of silanes alone having the epoxy group, or between silanes having the epoxy group with heterogeneous silanes in the presence of the catalyst.

Hydrolysis reaction in the presence of water and a catalyst is schematically shown in the following Reaction Schemes 1 and condensation reactions of silanes in the presence of a catalyst are schematically shown in the following Reaction Schemes 2 and 3:

[Reaction Scheme 1]

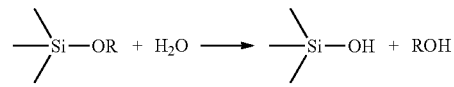

[Reaction Scheme 2]

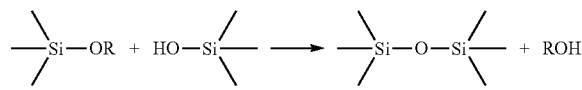

[Reaction Scheme 3]

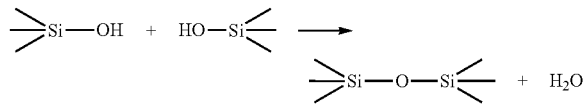

In Reaction Schemes 1 and 2, R is a straight or branched $C_1$ to $C_7$ alkyl group. Reaction Scheme 1 shows formation of a hydroxyl group resulting from hydrolysis of the alkoxy group of the silane by water and a catalyst. The hydroxyl group forms a siloxane bond through condensation reaction with the hydroxyl group or alkoxy group of another silane, as shown in Reaction Scheme 2 or 3, respectively. Thus, by controlling a reaction rate of the reaction, a weight-average molecular weight and a molecular weight distribution (PDI) of the finally formed siloxane resin can be controlled, and a reaction temperature, the amount and kind of a catalyst, a solvent, etc. may be major factors in such control mechanism.

The catalyst may be selected from the group consisting of an acidic catalyst, a basic catalyst, an ion exchange resin, and combinations thereof.

When the epoxy siloxane resin having a weight-average molecular weight in the range of from about 1,000 to about 10,000 and a molecular weight distribution of PDI ranging from about 1.0 to about 3.0 is prepared by the above Reaction Schemes, a catalyst is used in order to adjust the reaction rate. The available catalyst may include an acidic catalyst such as hydrochloric acid, acetic acid, hydrogen fluoride, nitric acid, sulfuric acid, chlorosulfonic acid, iodic acid, pyrophosphoric acid and the like; a basic catalyst such as ammonia, potassium hydroxide, potassium carbonate, sodium hydroxide, barium hydroxide, imidazole and the like; and an ion exchange resin such as Amberite IRA-400, IRA-67 and the like, and may also be selected from the group consisting of combinations thereof. The amount of the catalyst may not be particularly limited. However, the acidic or basic catalyst may be added in an amount of from about 0.0001 to about 0.01 parts by weight with respect to silanes in an amount of about 100 parts by weight, but may not be limited. The ion exchange resin may be added in an amount of from about 1 to about 10 parts by weight with respect to silanes in an amount of about 100 parts by weight, but may not be limited thereto.

The hydrolysis and condensation reaction may be performed at a room temperature for from about 12 hours to about 7 days under stirring. In order to facilitate the reaction, however, the hydrolysis and condensation reaction may be performed at a temperature ranging, e.g., from about 60° C. to about 100° C., for from about 2 hours to about 72 hours.

As shown in Reaction Schemes 1 to 3, when the reactions occur, alcohol and water are generated as byproducts. The alcohol and water are removed to reduce the reverse reaction and to induce the forward reaction, thereby controlling the reaction rate. In addition, when the reactions are terminated, alcohol and water remaining in the siloxane resin may be removed under a reduced pressure at a temperature ranging, e.g., from about 60° C. to about 100° C., for from about 10 minutes to about 60 minutes, but may not be limited thereto.

In accordance with an example embodiment of the present disclosure, the epoxy-siloxane resin may be prepared through hydrolysis and/or condensation reaction of the silanes alone having the epoxy group represented by the following Chemical Formula 1 in the presence of the catalyst:

$$\text{Fe } R^2Si(OR^3)_2; \quad \text{[Chemical Formula 1]}$$

wherein $R^1$ is a straight or branched $C_1$ to $C_6$ alkyl group including an epoxy group, $R^2$ is independently selected from the group consisting of a straight or branched $C_1$ to $C_6$ alkyl group including an epoxy group, a $C_1$ to $C_{20}$ alkyl group, a $C_3$ to $C_8$ cycloalkyl group, a $C_2$ to $C_{20}$ alkenyl group, a $C_2$ to $C_{20}$ alkynyl group, a $C_6$ to $C_{20}$ aryl group, an acryl group, a methacryl group, a halogen group, an amino group, a mercapto group, an ether group, an ester group, a carbonyl group, a carboxyl group, a vinyl group, a nitro group, a sulfone group, an alkyd group, a hydroxyl group, an imide group, a fluorine group, and an UV absorbing group, $R^3$ is independently hydrogen or a straight or branched $C_1$ to $C_7$ alkyl group.

Examples of the silanes represented by Chemical Formula 1 may include one or more selected from the group consisting of (3,4-epoxycyclohexyl)ethyldimethoxysilane, 2-(3,4-epoxycyclohexyl)ethyl(methyl)dimethoxysilane, (3,4-epoxycyclohexyl)ethyldiethoxysilane, 2-(3,4-epoxycyclohexyl)ethyl(methyl)diethoxysilane, (2-(7-oxabicyclo[4.1.0]heptan-3-yl)ethyl)(methyl)silanediol, dimethoxy(methyl)(3-(oxiran-2-yl)propyl)silane, diethoxy(methyl)(3-(oxiran-2-yl)propyl)silane, methyl(3-(oxiran-2-yl)propyl)silanediol, (3-glycidoxypropyl)dimethoxymethylsilane, (3-glycidoxypropyl)diethoxymethylsilane, and (3-glycidoxypropyl)methylsilanediol or the like, and their combinations, but may not be limited thereto.

Further, the epoxy-siloxane resin may be prepared through hydrolysis and/or condensation reaction between the silane having the epoxy group represented by Chemical Formula 1 with at least one heterogeneous silanes in the presence of the catalyst, but may not be limited thereto. The at least one heterogeneous silanes may be one or more selected from the group consisting of a silane represented by the following Chemical Formula 2, a silane represented by the following Chemical Formula 3 and a silane represented by the following Chemical Formula 4:

$$R^1R^2Si(OR^3)_2 \quad \text{[Chemical Formula 1]}$$

$$R^4R^5Si(OR^6)_2 \quad \text{[Chemical Formula 2]}$$

$$R^7Si(OR^8)_3 \quad \text{[Chemical Formula 3]}$$

$$Si(OR^9)_4; \quad \text{[Chemical Formula 4]}$$

wherein $R^1$ is a straight or branched $C_1$ to $C_6$ alkyl group including an epoxy group, $R^2$, $R^4$, $R^5$, and $R^7$ are independently selected from the group consisting of a straight or branched $C_1$ to $C_6$ alkyl group including an epoxy group, a $C_1$ to $C_{20}$ alkyl group, a $C_3$ to $C_8$ cycloalkyl group, a $C_2$ to $C_{20}$ alkenyl group, a $C_2$ to $C_{20}$ alkynyl group, a $C_6$ to $C_{20}$ aryl group, an acryl group, a methacryl group, a halogen group, an amino group, a mercapto group, an ether group, an ester group, a carbonyl group, a carboxyl group, a vinyl group, a nitro group, a sulfone group, an alkyd group, a hydroxyl group, an imide group, a fluorine group, and an UV absorbing group, $R^3$, $R^6$, $R^8$, and $R^9$ are independently hydrogen or a straight or branched $C_1$ to $C_7$ alkyl group; and wherein a mole ratio of the silane represented by Chemical Formula 1 to the total silanes is in the range of from 0.6 to 1, a mole ratio of the silane represented by Chemical Formula 2 to the total silanes is in the range of from 0 to 0.4, a mole ratio of the silane represented by Chemical Formula 3 to the total silanes is in the range of from 0 to 0.3 and a mole ratio of the silane represented by Chemical Formula 4 to the total silanes is in the range of from 0 to 0.2.

For example, the silanes represented by Chemical Formula 2, 3 and 4 may be one or more independently selected from the group consisting of tetramethoxysilane, tetraethoxysilane, methyltrimethoxysilane, methyltriethoxysilane, methyltripropoxysilane, dimethyldimethoxysilane, dimethyldiethoxysilane, phenyltrimethoxysilane, phenyltriethoxysilane, diphenyldimethoxysilane, diphenyldiethoxysilane, diphenyldisilanediol, triphenylmethoxysilane, triphenylethoxysilane, ethyltriethoxysilane, propyltrimethoxysilane, vinyltrimethoxysilane, vinyltriethoxysilane, vinyltripropoxysilane, N-(3-acryloxy-2-hydroxypropyl)-3-aminopropyltrimethoxysilane, N-(3-acryloxy-2-hydroxypropyl)-3-aminopropyltriethoxysilane, N-(3-acryloxy-2-hydroxypropyl)-3-aminopropyltripropoxysilane, (3-acryloxypropyl)methylbis(trimethylsiloxy)silane, 3-acryloxypropyltrimethoxysilane, 3-acryloxypropyltriethoxysilane, 3-acryloxypropyltripropoxysilane, 3-(meth)acryloxypropyltrimethoxysilane, 3-(meth)acryloxypropyltriethoxysilane, 3-(meth)acryloxypropyltripropoxysilane, N-(2-aminoethyl)-3- aminopropyltrimethoxysilane, N-(2-aminoethyl)-3-aminopropyltriethoxysilane, 3-aminopropyltrimethoxysilane, 3-aminopropyltriethoxysilane, chloropropyltrimethoxysilane, chloropropyltriethoxysilane, 2-(3,4-epoxycyclohexyl)ethyltrimethoxysilane, 2-(3,4-epoxycyclohexyl)ethyltriethoxysilane and heptadecafluorodecyltrimethoxysilane and the like, but may not be limited thereto.

In accordance with an example embodiment of the present disclosure, after the hydrolysis and/or condensation of the silanes is performed, the degree of condensation of silanes in the hard-coating resin composition is more than 60%. The degree of condensation of silanes may be typically determined by $^{29}$Si-NMR analysis.

In accordance with an example embodiment of the present disclosure, in preparing the siloxane hard-coating resin composition, the reactive monomer capable of forming crosslinking by reacting with the epoxy group may be further added. In order to provide easy processability by controlling the viscosity of the epoxy-siloxane resin, the reactive monomer capable of being subjected to photopolymerization or thermal polymerization may be further added to prepare siloxane hard-coating resin composition. Although the added amount of the reactive monomer may not be particularly limited, it may be preferable to add the reactive monomer in an amount of from about 1 to about 40 parts by weight with respect to the epoxy-siloxane resin in an amount of about 100 parts by weight. The reactive monomer may be a monomer having at least one of an epoxy group or an oxetane group, but may not be limited thereto.

In accordance with an example embodiment of the present disclosure, the hard-coating resin composition may further comprise a reactive monomer containing at least one of an epoxy group or an oxetane group, but may not be limited thereto.

In accordance with an example embodiment of the present disclosure, the reactive monomer may be one or more selected from the group consisting of 3-methyloxetane, 2-methyloxetane, 3-oxetanol, 2-methyleneoxetane, 3,3-oxetanedimethanethiol, 4-(3-methyloxetane-3-yl)benzonitrile, N-(2,2-dimethylpropyl)-3-methyl-3-oxetanemethanamine, N-(1,2-dimethylbutyl)-3-methyl-3-oxetanemethanamine, (3-ethyloxetane-3-yl)methyl methacrylate, 4-[(3-ethyloxetane-3-yl)methoxy]butan-1-ol, 3-ethyl-3-hydroxymethyloxetane, 2-ethylhexyloxetane, xylylene bisoxetane, 3-ethyl-3 [{(3-ethyloxetane-3-yl)methoxy}methyl]oxetane, 4-vinylcyclohexene dioxide, 4-vinylcyclohexene oxide, (3,4-epoxycyclohexyl)methyl 3,4-epoxycyclohexyl-carboxylate, 3,4-epoxycyclohexylmethyl methacrylate, bis(3,4-epoxycyclohexylmethyl) adipate, 3,4-epoxycyclohexancarboxylate, and 2-(3,4-epoxycyclohexyl)-1,3-dioxolane, but may not be limited thereto.

In accordance with an example embodiment of the present disclosure, an initiator for the polymerization of the epoxy-siloxane resin may be additionally included. By way of non-limiting example, a photo-polymerization initiator such as an onium salt, an organometallic salt or the like, and a thermal polymerization initiator such as an amine, an imidazole, or the like may be used as the initiator. The added amount of the polymerization initiator may not be particularly limited, but it may be to add the polymerization initiator in an amount of from about 0.1 to about 10 parts by weight with respect to the siloxane resin having the epoxy group in an amount of about 100 parts by weight, but may not be limited thereto.

By way of example, the photo-polymerization initiator may include one or more selected from the group consisting of an aryl sulfonium hexafluoroantimonate salt, an aryl sulfonium hexafluorophosphate salt, a diphenyliodonium hexafluorophosphate salt, a diphenyliodonium hexafluoroantimonate salt, a ditolyliodonium hexafluorophosphate salt, a 9-(4-hydroxyethoxyphenyl)thianthrenium hexafluorophosphate salt and the like, but may not be limited thereto.

Further, the thermal polymerization initiator may include one or more selected from the group consisting of a 3-methyl-2-butenyltetramethy lenesulfonium hexafluoroantimonate salt, an ytterbium(III) trifluoromethenesulfonate salt, a samarium(III) trifluoromethenesulfonate salt, an erbium(III) trifluoromethenesulfonate salt, a dysprosium(III) trifluoromethenesulfonate salt, a lanthanum(III) trifluoromethenesulfonate salt, a tetrabutylphosphonium methenesulfonate salt, an ethyltriphenylphosphonium bromide salt, benzyldimethylamine, dimethylaminomethylphenol, triethanolamine, N-n-butylimidazole, 2-ethyl-4-methyl-imidazole and the like, but may not be limited thereto.

In accordance with an example embodiment of the present disclosure, an organic solvent may be added in order to provide easy processability by controlling the viscosity of the epoxy siloxane resin and to control the thickness of a coating film at the same time. The added amount of the organic solvent may not be particularly limited. In case of alcohol, however, the added amount may be in the range of from about 0.1 to about 10 parts by weight with respect to the epoxy siloxane resin in an amount of about 100 parts by weight.

The available organic solvent may include one or more selected from the group consisting of ketones such as acetone, methylethylketone, methylbutylketone, methylisobutylketone, cyclohexanone and the like; cellosolves such as methyl cellosolve, ethyl cellosolve, cellosolve acetate, butyl cellosolve and the like; ethers such as ethyl ether, dioxane, tetrahydrofuran and the like; esters such as methyl acetate, ethyl acetate, propyl acetate, isopropyl acetate, butyl acetate, isobutyl acetate, pentyl acetate, isopentyl acetate and the like; alcohols such as butanol, 2-butanol, isobutyl alcohol, isopropyl alcohol and the like; halogenated hydrocarbons such as dichloromethane, chloroform, dichloroethane, trichloroethane, tetrachloroethane, dichloroethylene, trichloroethylene, tetrachloroethylene, chlorobenzene, ortho-dichlorobenzene and the like; hydrocarbons such as n-hexane, cyclohexanol, methylcyclohexanol, benzene, toluene, xylene and the like, but may not be limited thereto.

In accordance with an example embodiment of the present disclosure, the epoxy siloxane resin may include an antioxidant in order to prevent oxidation reaction of the polymeric species, but may not be limited thereto. The antioxidant may be a mixture of one or more selected from the group consisting of phenolic antioxidants, phosphite antioxidants, aminic antioxidants, thioester antioxidants or the like, but may not be limited thereto. For example, the phenolic antioxidant may include selected from the group consisting of tetrakis[methylene-3-(3,5-di-tert-butyl-4-hydroxyphenyl) propionate]methane, 1,2-bis(3,5-di-tert-butyl-4-hydroxyhydrocinnamoyl)hydrazine, thiodiethylene bis[3-(3,5-di-tert-butyl-4-hydroxyphenyl)propionate], octadecyl-3-(3,5-di-tert-butyl-4-hydroxyphenyl)propionate, isotridecyl-3-(3,5-di-tert-butyl-4-hydroxyphenyl)propionate, N,N'-hexamethylene bis(3,5-di-tert-butyl-4-hydroxyhydrocinnamamide), benzenepropanoic acid, 3,5-bis(1,1-dimethylethyl)-4-hydroxy-2,2'-ethylidene bis(4,6-di-tert-butylphenol), 1,3,5-trimethyl-2,4,6-tris(3,5-di-tert-butyl-4-hydroxybenzyl)benzene, 4,6-bis(octylthiomethyl)-o-cresol, 1,3,5-tris(2,6-dimethyl-3-hydroxy-4-tertbutylbenzyl)isocyanurate, 2,2'-methylene bis(4-methyl-6-tert-butylphenol), triethylene glycol-bis-3-(3-tert-butyl-4-hydroxy-5-methylphenyl)propionate, 2,5-di-tert-amyl-hydroquinone, hexa methylene bis[3-(3,5-di-tert-butyl-4-hydroxyphenyl)propionate], tris-(3,5-di-tert-butylhydroxybenzyl) isocyanurate, 4,4'-thiobis(6-tert-butyl-m-cresol), 4,4'-butylidene bis (6-tert-butyl-3-methylphenol) and combinations thereof. The phosphite antioxidant may include selected from the group consisting of tris(2,4-di-tert-butylphenyl)phosphite, distearyl pentaerythritol diphosphite, bis(2,4-di-tert-butylphenyl) pentaerythritol diphosphite, triphenyl phosphite, triisodecyl phosphite, diphenylisodecyl phosphite, 2-ethylhexyl diphenyl phosphite, poly(dipropylene glycol)phenyl phosphite, tris(nonylphenyl)phosphite and combinations thereof, the aminic antioxidant may include 2,2,4-trimethyl-1,2-dihyd-roquinoline oligomer, the thioester antioxidant may include selected from the group consisting of pentaerythritol tetrakis(3-laurylthiopropionate), distearyl thiodipropionate, dilauryl thiodipropionate, ditridecyl thiodipropionate and combinations thereof, but may not be limited thereto. Although the addition amount of the antioxidant may not be particularly limited, it may be to add it in an amount of from about 0.1 to about 10 parts by weight with respect to the epoxy siloxane resin of about 100 parts by weight.

In accordance with an example embodiment of the present disclosure, the hard-coating resin composition may further comprise one or more additives selected from the group consisting of an organic solvent, an antioxidant, a leveling agent, an UV absorber, a hindered amine light stabilizer and a flow control agent, but may not be limited thereto.

In accordance with an example embodiment of the present disclosure, the hard-coating resin composition may further include a leveling agent or a flow control agent, but may not be limited thereto.

The hard-coating resin composition of the present disclosure can be used for forming a cured hard-coating article having good hardness with flexibility under inward and outward bending conditions, which makes the hard-coating resin composition very useful for applying it to various flexible devices or displays. The present disclosure provides a cured hard-coating article using the hard-coating resin composition and an optical film or sheet including the cured hard-coating article. The present disclosure provides a device such as a display unit, comprising the optical film of the fourth aspect of the present disclosure.

In accordance with a second aspect of the present disclosure, there is provided a method of preparing a cured hard-coating article, including a polymerization of the hard-coating resin composition of the first aspect of the present disclosure.

In accordance with an example embodiment of the present disclosure, the polymerization may include a step of irradiating light, heating, or humid-annealing, but may not be limited thereto.

In accordance with an example embodiment of the present disclosure, after coating, casting, and molding steps of the epoxy siloxane resin composition, photo-polymerization or thermal polymerization may be performed to prepare a siloxane cured hard-coating article having high surface hardness and flexibility. In the polymerization steps, humid annealing may be performed to reduce the curing time, obtain the homogeneous curing density and control the curl. The humid annealing may be performed at a temperature ranging from about 50° C. or more to about 250° C. or less inclusive, but may not be limited thereto. The temperature of the humid annealing may vary depending on process conditions for the siloxane cured hard-coating article. If the temperature of the humid annealing is higher than about 250° C., bonding chains between organic functional groups may be broken. If the temperature of the humid annealing is lower than about 50° C., the polymerization may not be performed sufficiently.

In accordance with a third aspect of the present disclosure, there is provided a cured hard-coating article, including the hard-coating resin composition of the first aspect of the present disclosure.

In accordance with an example embodiment of the present disclosure, the cured hard-coating article is prepared by a polymerization of the hard-coating resin composition.

In accordance with an example embodiment of the present disclosure, the polymerization may include a step of irradiating light, heating, or humid-annealing, but may not be limited thereto.

In accordance with a fourth aspect of the present disclosure, there is provided an optical film, comprising the cured hard-coating article of the third aspect of the present disclosure.

In accordance with an example embodiment of the present disclosure, the cured hard-coating article is prepared by a polymerization of the hard-coating resin composition.

In accordance with an example embodiment of the present disclosure, the polymerization may include a step of irradiating light, heating, or humid-annealing, but may not be limited thereto.

In accordance with an example embodiment of the present disclosure, the optical film is in a form of sheet, but may not be limited thereto.

In accordance with a fifth aspect of the present disclosure, there is provided a device, comprising the optical film of the fourth aspect of the present disclosure.

In accordance with an example embodiment of the present disclosure, the device includes various flexible devices including a display unit and any other display means, or electronic or optical devices, but may not be limited thereto.

In accordance with an example embodiment of the present disclosure, the device includes the optical film as a cover film or protective film to maintain good hardness and flexibility under inward and outward bending conditions, but may not be limited thereto.

Hereinafter, example embodiments are described in more detail by using Examples, but the present disclosure may not be limited to the Examples.

EXAMPLES

In order to facilitate coating of siloxane resin compositions obtained in the following examples and improve processability, methylethylketone was added as an organic solvent. Further, in order to measure the surface hardness of siloxane cured hard-coating articles obtained in the following examples, a pencil hardness tester according to KS M ISO 15184 was used. In order to measure the flexibility of siloxane cured hard-coating articles obtained in the following examples, a dynamic folding tester (Model: DLDMLH-FS, Maker: YUASA SYSTEM Co., Ltd.) was used.

Example 1

2-(3,4-epoxycyclohexyl)ethyl(methyl)dimethoxysilane (ECDMS, Gelest) and water ($H_2O$, Sigma-Aldrich) were mixed at a ratio of 23.04 g:3.60 g (0.1 mol:0.2 mol), and then put into an about 100 mL of 2-neck flask. Thereafter, 0.03 mL of hydrochloric acid as a catalyst was added to the mixture, and stirred at 60° C. for 72 hours. The mixture was filtered using a 0.45 µm Teflon filter, thereby obtaining an epoxy siloxane resin. The degree of condensation of the epoxy-siloxane resin was calculated using $^{29}$Si-NMR analysis. It was confirmed that the epoxy-siloxane resin has a degree of condensation of 82%.

Next, 3-ethyl-3[{(3-ethyloxetane-3-yl)methoxy}methyl] oxetane as a reactive monomer was added in an amount of 10 parts by weight with respect to the resin, and triarylsulfonium hexafluoroantimonate salts, mixed 50% in propylene carbonate (Sigma-Aldrich) as a polymerization initiator for photo-polymerization was added in an amount of 2 parts by weight with respect to the resin. Then, as antioxidants to prevent oxidation of the polymeric species, iso-octyl-3-(3,5-di-tert-butyl-4-hydroxyphenyl)propionate and tris(nonylphenyl)phosphite were added in amounts of 1.35 parts by weight and 3.6 parts by weight, respectively, with respect to the resultant resin, thereby obtaining a siloxane hard-coating resin composition.

The siloxane hard-coating resin composition was coated on the surface of 50 µm thick PET films in thicknesses of 1 µm, and then exposed to a UV lamp (20 mW/cm$^2$ at 365 nm) for 1 minute for photocuring. After photocuring was completely finished, humid annealing was performed at a temperature of 85° C./85% RH for 1 hour, thereby producing a siloxane cured hard-coating article.

Example 2

2-(3,4-epoxycyclohexyl)ethyl(methyl)dimethoxysilane (ECDMS, Gelest) and water (H$_2$O, Sigma-Aldrich) were mixed at a ratio of 23.04 g:3.60 g (0.1 mol:0.2 mol), and then put into an about 100 mL of 2-neck flask. Thereafter, 0.02 mL of hydrochloric acid as a catalyst was added to the mixture, and stirred at 60° C. for 24 hours. The mixture was filtered using a 0.45 µm Teflon filter, thereby obtaining an epoxy siloxane resin. The degree of condensation of the epoxy-siloxane resin was calculated using $^{29}$Si-NMR analysis. It was confirmed that the epoxy-siloxane resin has a degree of condensation of 65%.

Next, 3-ethyl-3[{(3-ethyloxetane-3-yl)methoxy}methyl] oxetane as a reactive monomer was added in an amount of 10 parts by weight with respect to the resin, and triarylsulfonium hexafluoroantimonate salts, mixed 50% in propylene carbonate (Sigma-Aldrich) as a polymerization initiator for photo-polymerization was added in an amount of 2 parts by weight with respect to the resin. Then, as antioxidants to prevent oxidation of the polymeric species, iso-octyl-3-(3,5-di-tert-butyl-4-hydroxyphenyl)propionate and tris(nonylphenyl)phosphite were added in amounts of 1.35 parts by weight and 3.6 parts by weight, respectively, with respect to the resultant resin, thereby obtaining a siloxane hard-coating resin composition.

The siloxane hard-coating resin composition was coated on the surface of 50 µm thick PET films in thicknesses of 1 µm, and then exposed to a UV lamp (20 mW/cm$^2$ at 365 nm) for 1 minute for photocuring. After photocuring was completely finished, humid annealing was performed at a temperature of 85° C./85% RH for 1 hour, thereby producing a siloxane cured hard-coating article.

Example 3

Dimethoxy(methyl)(3-(oxiran-2-yl)propyl)silane (GPDMS, Gelest) and water (H$_2$O, Sigma-Aldrich) were mixed at a ratio of 22.01 g:3.60 g (0.1 mol:0.2 mol), and then put into an about 100 mL of 2-neck flask. Thereafter, 0.05 mL of ammonia as a catalyst was added to the mixture, and stirred at 60° C. for 72 hours. The mixture was filtered using a 0.45 µm Teflon filter, thereby obtaining an epoxy siloxane resin. The degree of condensation of the epoxy-siloxane resin was calculated using $^{29}$Si-NMR analysis. It was confirmed that the epoxy-siloxane resin has a degree of condensation of 75%.

Next, (3,4-epoxycyclohexyl)methyl 3,4-epoxycyclohexylcarboxylate as a reactive monomer was added in an amount of 20 parts by weight with respect to the resin, and triarylsulfonium hexafluoroantimonate salts, mixed 50% in propylene carbonate (Sigma-Aldrich) as a polymerization initiator for photo-polymerization was added in an amount of 2 parts by weight with respect to the resin. Then, as antioxidants to prevent oxidation of the polymeric species, iso-octyl-3-(3,5-di-tert-butyl-4-hydroxyphenyl)propionate and tris(nonylphenyl)phosphite were added in amounts of 1.35 parts by weight and 3.6 parts by weight, respectively, with respect to the resultant resin, thereby obtaining a siloxane hard-coating resin composition.

The siloxane hard-coating resin composition was coated on the surface of 50 µm thick PET films in thicknesses of 1 µm, and then exposed to a UV lamp (20 mW/cm$^2$ at 365 nm) for 1 minute for photocuring. After photocuring was completely finished, humid annealing was performed at a temperature of 85° C./85% RH for 1 hour, thereby producing a siloxane cured hard-coating article.

Example 4

2-(3,4-epoxycyclohexyl)ethyl(methyl)dimethoxysilane (ECDMS, Gelest), diphenyldimethoxysilane (DPDMS, Gelest) and water (H$_2$O, Sigma-Aldrich) were mixed at a ratio of 18.43 g:4.89 g:3.60 g (0.08 mol:0.02 mol:0.2 mol), and then put into an about 100 mL of 2-neck flask. Thereafter, 0.05 mL of ammonia as a catalyst was added to the mixture, and stirred at 60° C. for 72 hours. The mixture was filtered using a 0.45 µm Teflon filter, thereby obtaining an epoxy siloxane resin. The degree of condensation of the epoxy-siloxane resin was calculated using $^{29}$Si-NMR analysis. It was confirmed that the epoxy-siloxane resin has a degree of condensation of 86%.

Next, triarylsulfonium hexafluoroantimonate salts, mixed 50% in propylene carbonate (Sigma-Aldrich) as a polymerization initiator for photo-polymerization was added in an amount of 2 parts by weight with respect to the resin. Then, as antioxidants to prevent oxidation of the polymeric species, iso-octyl-3-(3,5-di-tert-butyl-4-hydroxyphenyl)propionate and tris(nonylphenyl)phosphite were added in amounts of 1.35 parts by weight and 3.6 parts by weight, respectively, with respect to the resultant resin, thereby obtaining a siloxane hard-coating resin composition.

The siloxane hard-coating resin composition was coated on the surface of 50 µm thick PET films in thicknesses of 1 µm, and then exposed to a UV lamp (20 mW/cm$^2$ at 365 nm) for 1 minute for photocuring. After photocuring was completely finished, humid annealing was performed at a temperature of 85° C./85% RH for 1 hour, thereby producing a siloxane cured hard-coating article.

Example 5

2-(3,4-epoxycyclohexyl)ethyl(methyl)dimethoxysilane (ECDMS, Gelest), diphenyldimethoxysilane (DPDMS, Gelest) and water (H$_2$O, Sigma-Aldrich) were mixed at a ratio of 13.82 g:9.77 g:3.60 g (0.06 mol:0.04 mol:0.2 mol), and then put into an about 100 mL of 2-neck flask. Thereafter, 0.05 mL of ammonia as a catalyst was added to the mixture, and stirred at 60° C. for 72 hours. The mixture was filtered using a 0.45 µm Teflon filter, thereby obtaining an epoxy-siloxane resin. The degree of condensation of the epoxy-siloxane resin was calculated using $^{29}$Si-NMR analysis. It was confirmed that the epoxy-siloxane resin has a degree of condensation of 85%.

Next, triarylsulfonium hexafluoroantimonate salts, mixed 50% in propylene carbonate (Sigma-Aldrich) as a polymerization initiator for photo-polymerization was added in an amount of 2 parts by weight with respect to the resin. Then, as antioxidants to prevent oxidation of the polymeric species, iso-octyl-3-(3,5-di-tert-butyl-4-hydroxyphenyl)propionate and tris(nonylphenyl)phosphite were added in amounts of 1.35 parts by weight and 3.6 parts by weight, respectively, with respect to the resultant resin, thereby obtaining a siloxane hard-coating resin composition.

The siloxane hard-coating resin composition was coated on the surface of 50 µm thick PET films in thicknesses of 1 µm, and then exposed to a UV lamp (20 mW/cm$^2$ at 365 nm) for 1 minute for photocuring. After photocuring was completely finished, humid annealing was performed at a temperature of 85° C./85% RH for 1 hour, thereby producing a siloxane cured hard-coating article.

Example 6

2-(3,4-epoxycyclohexyl)ethyl(methyl)dimethoxysilane (ECDMS, Gelest), phenyltrimethoxysilane (PTMS, Gelest) and water (H$_2$O, Sigma-Aldrich) were mixed at a ratio of 20.73 g:1.98 g:3.78 g (0.09 mol:0.01 mol:0.21 mol), and then put into an about 100 mL of 2-neck flask. Thereafter, 0.03 mL of hydrochloric acid as a catalyst was added to the mixture, and stirred at 60° C. for 72 hours. The mixture was filtered using a 0.45 µm Teflon filter, thereby obtaining an epoxy-siloxane resin. The degree of condensation of the epoxy-siloxane resin was calculated using $^{29}$Si-NMR analysis. It was confirmed that the epoxy-siloxane resin has a degree of condensation of 88%.

Next, 3-ethyl-3[{(3-ethyloxetane-3-yl)methoxy}methyl] oxetane as a reactive monomer was added in an amount of 10 parts by weight with respect to the resin, and triarylsulfonium hexafluoroantimonate salts, mixed 50% in propylene carbonate (Sigma-Aldrich) as a polymerization initiator for photo-polymerization was added in an amount of 2 parts by weight with respect to the resin. Then, as antioxidants to prevent oxidation of the polymeric species, iso-octyl-3-(3, 5-di-tert-butyl-4-hydroxyphenyl)propionate and tris(nonylphenyl)phosphite were added in amounts of 1.35 parts by weight and 3.6 parts by weight, respectively, with respect to the resultant resin, thereby obtaining a siloxane hard-coating resin composition.

The siloxane hard-coating resin composition was coated on the surface of 50 µm thick PET films in thicknesses of 1 µm, and then exposed to a UV lamp (20 mW/cm$^2$ at 365 nm) for 1 minute for photocuring. After photocuring was completely finished, humid annealing was performed at a temperature of 85° C./85% RH for 1 hour, thereby producing a siloxane cured hard-coating article.

Example 7

2-(3,4-epoxycyclohexyl)ethyl(methyl)dimethoxysilane (ECDMS, Gelest), phenyltrimethoxysilane (PTMS, Gelest) and water (H$_2$O, Sigma-Aldrich) were mixed at a ratio of 16.13 g:5.94 g:3.96 g (0.07 mol:0.03 mol:0.22 mol), and then put into an about 100 mL of 2-neck flask. Thereafter, 0.03 mL of hydrochloric acid as a catalyst was added to the mixture, and stirred at 60° C. for 72 hours. The mixture was filtered using a 0.45 µm Teflon filter, thereby obtaining an epoxy-siloxane resin. The degree of condensation of the epoxy-siloxane resin was calculated using $^{29}$Si-NMR analysis. It was confirmed that the epoxy-siloxane resin has a degree of condensation of 87%.

Next, 3-ethyl-3[{(3-ethyloxetane-3-yl)methoxy}methyl] oxetane as a reactive monomer was added in an amount of 10 parts by weight with respect to the resin, and triarylsulfonium hexafluoroantimonate salts, mixed 50% in propylene carbonate (Sigma-Aldrich) as a polymerization initiator for photo-polymerization was added in an amount of 2 parts by weight with respect to the resin. Then, as antioxidants to prevent oxidation of the polymeric species, iso-octyl-3-(3, 5-di-tert-butyl-4-hydroxyphenyl)propionate and tris(nonylphenyl)phosphite were added in amounts of 1.35 parts by weight and 3.6 parts by weight, respectively, with respect to the resultant resin, thereby obtaining a siloxane hard-coating resin composition.

The siloxane hard-coating resin composition was coated on the surface of 50 µm thick PET films in thicknesses of 1 µm, and then exposed to a UV lamp (20 mW/cm$^2$ at 365 nm) for 1 minute for photocuring. After photocuring was completely finished, humid annealing was performed at a temperature of 85° C./85% RH for 1 hour, thereby producing a siloxane cured hard-coating article.

Example 8

2-(3,4-epoxycyclohexyl)ethyl(methyl)dimethoxysilane (ECDMS, Gelest), tetraethoxysilane (TEOS, Gelest) and water (H$_2$O, Sigma-Aldrich) were mixed at a ratio of 20.73 g:2.08 g:3.96 g (0.09 mol:0.01 mol:0.22 mol), and then put into an about 100 mL of 2-neck flask. Thereafter, 0.05 mL of ammonia as a catalyst was added to the mixture, and stirred at 60° C. for 72 hours. The mixture was filtered using a 0.45 µm Teflon filter, thereby obtaining an epoxy-siloxane resin. The degree of condensation of the epoxy-siloxane resin was calculated using $^{29}$Si-NMR analysis. It was confirmed that the epoxy-siloxane resin has a degree of condensation of 82%.

Next, 3-ethyl-3-hydroxymethyloxetane as a reactive monomer was added in an amount of 30 parts by weight with respect to the resin, and triarylsulfonium hexafluoroantimonate salts, mixed 50% in propylene carbonate (Sigma-Aldrich) as a polymerization initiator for photo-polymerization was added in an amount of 2 parts by weight with respect to the resin. Then, as antioxidants to prevent oxidation of the polymeric species, iso-octyl-3-(3,5-di-tert-butyl-4-hydroxyphenyl)propionate and tris(nonylphenyl)phosphite were added in amounts of 1.35 parts by weight and 3.6 parts by weight, respectively, with respect to the resultant resin, thereby obtaining a siloxane hard-coating resin composition.

The siloxane hard-coating resin composition was coated on the surface of 50 µm thick PET films in thicknesses of 1 µm, and then exposed to a UV lamp (20 mW/cm$^2$ at 365 nm) for 1 minute for photocuring. After photocuring was completely finished, humid annealing was performed at a temperature of 85° C./85% RH for 1 hour, thereby producing a siloxane cured hard-coating article.

Example 9

2-(3,4-epoxycyclohexyl)ethyl(methyl)dimethoxysilane (ECDMS, Gelest), tetraethoxysilane (TEOS, Gelest) and water ($H_2O$, Sigma-Aldrich) were mixed at a ratio of 18.43 g:4.16 g:4.14 g (0.08 mol:0.02 mol:0.23 mol), and then put into an about 100 mL of 2-neck flask. Thereafter, 0.05 mL of ammonia as a catalyst was added to the mixture, and stirred at 60° C. for 72 hours. The mixture was filtered using a 0.45 μm Teflon filter, thereby obtaining an epoxy-siloxane resin. The degree of condensation of the epoxy-siloxane resin was calculated using $^{29}$Si-NMR analysis. It was confirmed that the epoxy-siloxane resin has a degree of condensation of 81%.

Next, 3-ethyl-3-hydroxymethyloxetane as a reactive monomer was added in an amount of 30 parts by weight with respect to the resin, and triarylsulfonium hexafluoroantimonate salts, mixed 50% in propylene carbonate (Sigma-Aldrich) as a polymerization initiator for photo-polymerization was added in an amount of 2 parts by weight with respect to the resin. Then, as antioxidants to prevent oxidation of the polymeric species, iso-octyl-3-(3,5-di-tert-butyl-4-hydroxyphenyl)propionate and tris(nonylphenyl)phosphite were added in amounts of 1.35 parts by weight and 3.6 parts by weight, respectively, with respect to the resultant resin, thereby obtaining a siloxane hard-coating resin composition.

The siloxane hard-coating resin composition was coated on the surface of 50 μm thick PET films in thicknesses of 1 μm, and then exposed to a UV lamp (20 mW/cm$^2$ at 365 nm) for 1 minute for photocuring. After photocuring was completely finished, humid annealing was performed at a temperature of 85° C./85% RH for 1 hour, thereby producing a siloxane cured hard-coating article.

Example 10

2-(3,4-epoxycyclohexyl)ethyl(methyl)dimethoxysilane (ECDMS, Gelest), diphenyldimethoxysilane (DPDMS, Gelest), phenyltrimethoxysilane (PTMS, Gelest), tetraethoxysilane (TEOS, Gelest) and water ($H_2O$, Sigma-Aldrich) were mixed at a ratio of 16.13 g:3.67 g:1.98 g:1.04 g:4.32 g (0.07 mol:0.015 mol:0.01 mol:0.005 mol:0.24 mol), and then put into an about 100 mL of 2-neck flask. Thereafter, 0.05 mL of ammonia as a catalyst was added to the mixture, and stirred at 60° C. for 72 hours. The mixture was filtered using a 0.45 μm Teflon filter, thereby obtaining an epoxy-siloxane resin. The degree of condensation of the epoxy-siloxane resin was calculated using $^{29}$Si-NMR analysis. It was confirmed that the epoxy-siloxane resin has a degree of condensation of 85%.

Next, (3,4-epoxycyclohexyl)methyl 3,4-epoxycyclohexylcarboxylate as a reactive monomer was added in an amount of 20 parts by weight with respect to the resin, and triarylsulfonium hexafluoroantimonate salts, mixed 50% in propylene carbonate (Sigma-Aldrich) as a polymerization initiator for photo-polymerization was added in an amount of 2 parts by weight with respect to the resin. Then, as antioxidants to prevent oxidation of the polymeric species, iso-octyl-3-(3,5-di-tert-butyl-4-hydroxyphenyl)propionate and tris(nonylphenyl)phosphite were added in amounts of 1.35 parts by weight and 3.6 parts by weight, respectively, with respect to the resultant resin, thereby obtaining a siloxane hard-coating resin composition.

The siloxane hard-coating resin composition was coated on the surface of 50 μm thick PET films in thicknesses of 1 μm, and then exposed to a UV lamp (20 mW/cm$^2$ at 365 nm) for 1 minute for photocuring. After photocuring was completely finished, humid annealing was performed at a temperature of 85° C./85% RH for 1 hour, thereby producing a siloxane cured hard-coating article.

Example 11

2-(3,4-epoxycyclohexyl)ethyl(methyl)dimethoxysilane (ECDMS, Gelest), 2-(3,4-epoxycyclohexyl)ethyltrimethoxysilane (ECTMS, Gelest) and water ($H_2O$, Sigma-Aldrich) were mixed at a ratio of 20.73 g:2.46 g:3.78 g (0.09 mol:0.01 mol:0.21 mol), and then put into an about 100 mL of 2-neck flask. Thereafter, 0.05 mL of ammonia as a catalyst was added to the mixture, and stirred at 60° C. for 72 hours. The mixture was filtered using a 0.45 μm Teflon filter, thereby obtaining an epoxy-siloxane resin. The degree of condensation of the epoxy-siloxane resin was calculated using $^{29}$Si-NMR analysis. It was confirmed that the epoxy-siloxane resin has a degree of condensation of 87%.

Next, 3-ethyl-3[{(3-ethyloxetane-3-yl)methoxy}methyl]oxetane as a reactive monomer was added in an amount of 10 parts by weight with respect to the resin, and triarylsulfonium hexafluoroantimonate salts, mixed 50% in propylene carbonate (Sigma-Aldrich) as a polymerization initiator for photo-polymerization was added in an amount of 2 parts by weight with respect to the resin. Then, as antioxidants to prevent oxidation of the polymeric species, iso-octyl-3-(3,5-di-tert-butyl-4-hydroxyphenyl)propionate and tris(nonylphenyl)phosphite were added in amounts of 1.35 parts by weight and 3.6 parts by weight, respectively, with respect to the resultant resin, thereby obtaining a siloxane hard-coating resin composition.

The siloxane hard-coating resin composition was coated on the surface of 50 μm thick PET films in thicknesses of 1 μm, and then exposed to a UV lamp (20 mW/cm$^2$ at 365 nm) for 1 minute for photocuring. After photocuring was completely finished, humid annealing was performed at a temperature of 85° C./85% RH for 1 hour, thereby producing a siloxane cured hard-coating article.

Example 12

2-(3,4-epoxycyclohexyl)ethyl(methyl)dimethoxysilane (ECDMS, Gelest), 2-(3,4-epoxycyclohexyl)ethyltrimethoxysilane (ECTMS, Gelest) and water ($H_2O$, Sigma-Aldrich) were mixed at a ratio of 16.13 g:7.39 g:3.96 g (0.07 mol:0.03 mol:0.22 mol), and then put into an about 100 mL of 2-neck flask. Thereafter, 0.05 mL of ammonia as a catalyst was added to the mixture, and stirred at 60° C. for 72 hours. The mixture was filtered using a 0.45 μm Teflon filter, thereby obtaining an epoxy-siloxane resin. The degree of condensation of the epoxy-siloxane resin was calculated using $^{29}$Si-NMR analysis. It was confirmed that the epoxy-siloxane resin has a degree of condensation of 88%.

Next, 3-ethyl-3[{(3-ethyloxetane-3-yl)methoxy}methyl]oxetane as a reactive monomer was added in an amount of 10 parts by weight with respect to the resin, and triarylsulfonium hexafluoroantimonate salts, mixed 50% in propylene carbonate (Sigma-Aldrich) as a polymerization initiator for photo-polymerization was added in an amount of 2 parts by weight with respect to the resin. Then, as antioxidants to prevent oxidation of the polymeric species, iso-octyl-3-(3,5-di-tert-butyl-4-hydroxyphenyl)propionate and tris(nonylphenyl)phosphite were added in amounts of 1.35 parts by weight and 3.6 parts by weight, respectively, with respect to the resultant resin, thereby obtaining a siloxane hard-coating resin composition.

The siloxane hard-coating resin composition was coated on the surface of 50 μm thick PET films in thicknesses of 1

μm, and then exposed to a UV lamp (20 mW/cm² at 365 nm) for 1 minute for photocuring. After photocuring was completely finished, humid annealing was performed at a temperature of 85° C./85% RH for 1 hour, thereby producing a siloxane cured hard-coating article.

Comparative Example 1

2-(3,4-epoxycyclohexyl)ethyl(methyl)dimethoxysilane (ECDMS, Gelest) and water (H₂O, Sigma-Aldrich) were mixed at a ratio of 23.04 g:3.60 g (0.1 mol:0.2 mol), and then put into an about 100 mL of 2-neck flask. Thereafter, 0.01 mL of hydrochloric acid as a catalyst was added to the mixture, and stirred at 60° C. for 12 hours. The mixture was filtered using a 0.45 μm Teflon filter, thereby obtaining an epoxy siloxane resin. The degree of condensation of the epoxy-siloxane resin was calculated using ²⁹Si-NMR analysis. It was confirmed that the epoxy-siloxane resin has a degree of condensation of 55%.

Next, 3-ethyl-3[{(3-ethyloxetane-3-yl)methoxy}methyl] oxetane as a reactive monomer was added in an amount of 10 parts by weight with respect to the resin, and triarylsulfonium hexafluoroantimonate salts, mixed 50% in propylene carbonate (Sigma-Aldrich) as a polymerization initiator for photo-polymerization was added in an amount of 2 parts by weight with respect to the resin. Then, as antioxidants to prevent oxidation of the polymeric species, iso-octyl-3-(3,5-di-tert-butyl-4-hydroxyphenyl)propionate and tris(nonylphenyl)phosphite were added in amounts of 1.35 parts by weight and 3.6 parts by weight, respectively, with respect to the resultant resin, thereby obtaining a siloxane hard-coating resin composition.

The siloxane hard-coating resin composition was coated on the surface of 50 μm thick PET films in thicknesses of 1 μm, and then exposed to a UV lamp (20 mW/cm² at 365 nm) for 1 minute for photocuring. After photocuring was completely finished, humid annealing was performed at a temperature of 85° C./85% RH for 1 hour, thereby producing a siloxane cured hard-coating article.

Comparative Example 2

2-(3,4-epoxycyclohexyl)ethyl(methyl)dimethoxysilane (ECDMS, Gelest), diphenyldimethoxysilane (DPDMS, Gelest) and water (H₂O, Sigma-Aldrich) were mixed at a ratio of 11.52 g:12.22 g:3.60 g (0.05 mol:0.05 mol:0.2 mol), and then put into an about 100 mL of 2-neck flask. Thereafter, 0.05 mL of ammonia as a catalyst was added to the mixture, and stirred at 60° C. for 72 hours. The mixture was filtered using a 0.45 μm Teflon filter, thereby obtaining an epoxy-siloxane resin. The degree of condensation of the epoxy-siloxane resin was calculated using ²⁹Si-NMR analysis. It was confirmed that the epoxy-siloxane resin has a degree of condensation of 85%.

Next, triarylsulfonium hexafluoroantimonate salts, mixed 50% in propylene carbonate (Sigma-Aldrich) as a polymerization initiator for photo-polymerization was added in an amount of 2 parts by weight with respect to the resin. Then, as antioxidants to prevent oxidation of the polymeric species, iso-octyl-3-(3,5-di-tert-butyl-4-hydroxyphenyl)propionate and tris(nonylphenyl)phosphite were added in amounts of 1.35 parts by weight and 3.6 parts by weight, respectively, with respect to the resultant resin, thereby obtaining a siloxane hard-coating resin composition.

The siloxane hard-coating resin composition was coated on the surface of 50 μm thick PET films in thicknesses of 1 μm, and then exposed to a UV lamp (20 mW/cm² at 365 nm) for 1 minute for photocuring. After photocuring was completely finished, humid annealing was performed at a temperature of 85° C./85% RH for 1 hour, thereby producing a siloxane cured hard-coating article.

Comparative Example 3

2-(3,4-epoxycyclohexyl)ethyl(methyl)dimethoxysilane (ECDMS, Gelest), phenyltrimethoxysilane (PTMS, Gelest) and water (H₂O, Sigma-Aldrich) were mixed at a ratio of 13.82 g:7.92 g:4.32 g (0.06 mol:0.04 mol:0.24 mol), and then put into an about 100 mL of 2-neck flask. Thereafter, 0.03 mL of hydrochloric acid as a catalyst was added to the mixture, and stirred at 60° C. for 72 hours. The mixture was filtered using a 0.45 μm Teflon filter, thereby obtaining an epoxy-siloxane resin. The degree of condensation of the epoxy-siloxane resin was calculated using ²⁹Si-NMR analysis. It was confirmed that the epoxy-siloxane resin has a degree of condensation of 83%.

Next, 3-ethyl-3[{(3-ethyloxetane-3-yl)methoxy}methyl] oxetane as a reactive monomer was added in an amount of 10 parts by weight with respect to the resin, and triarylsulfonium hexafluoroantimonate salts, mixed 50% in propylene carbonate (Sigma-Aldrich) as a polymerization initiator for photo-polymerization was added in an amount of 2 parts by weight with respect to the resin. Then, as antioxidants to prevent oxidation of the polymeric species, iso-octyl-3-(3,5-di-tert-butyl-4-hydroxyphenyl)propionate and tris(nonylphenyl)phosphite were added in amounts of 1.35 parts by weight and 3.6 parts by weight, respectively, with respect to the resultant resin, thereby obtaining a siloxane hard-coating resin composition.

The siloxane hard-coating resin composition was coated on the surface of 50 μm thick PET films in thicknesses of 1 μm, and then exposed to a UV lamp (20 mW/cm² at 365 nm) for 1 minute for photocuring. After photocuring was completely finished, humid annealing was performed at a temperature of 85° C./85% RH for 1 hour, thereby producing a siloxane cured hard-coating article.

Comparative Example 4

2-(3,4-epoxycyclohexyl)ethyl(methyl)dimethoxysilane (ECDMS, Gelest), tetraethoxysilane (TEOS, Gelest) and water (H₂O, Sigma-Aldrich) were mixed at a ratio of 16.13 g:6.24 g:4.51 g (0.07 mol:0.03 mol:0.25 mol), and then put into an about 100 mL of 2-neck flask. Thereafter, 0.05 mL of ammonia as a catalyst was added to the mixture, and stirred at 60° C. for 72 hours. The mixture was filtered using a 0.45 μm Teflon filter, thereby obtaining an epoxy-siloxane resin. The degree of condensation of the epoxy-siloxane resin was calculated using ²⁹Si-NMR analysis. It was confirmed that the epoxy-siloxane resin has a degree of condensation of 84%.

Next, 3-ethyl-3-hydroxymethyloxetane as a reactive monomer was added in an amount of 30 parts by weight with respect to the resin, and triarylsulfonium hexafluoroantimonate salts, mixed 50% in propylene carbonate (Sigma-Aldrich) as a polymerization initiator for photo-polymerization was added in an amount of 2 parts by weight with respect to the resin. Then, as antioxidants to prevent oxidation of the polymeric species, iso-octyl-3-(3,5-di-tert-butyl-4-hydroxyphenyl)propionate and tris(nonylphenyl)phosphite were added in amounts of 1.35 parts by weight and 3.6 parts by weight, respectively, with respect to the resultant resin, thereby obtaining a siloxane hard-coating resin composition.

The siloxane hard-coating resin composition was coated on the surface of 50 μm thick PET films in thicknesses of 1 μm, and then exposed to a UV lamp (20 mW/cm² at 365 nm) for 1 minute for photocuring. After photocuring was completely finished, humid annealing was performed at a temperature of 85° C./85% RH for 1 hour, thereby producing a siloxane cured hard-coating article.

Comparative Example 5

2-(3,4-epoxycyclohexyl)ethyl(methyl)dimethoxysilane (ECDMS, Gelest), 2-(3,4-epoxycyclohexyl)ethyltrimethoxysilane (ECTMS, Gelest) and water (H₂O, Sigma-Aldrich) were mixed at a ratio of 13.82 g:9.86 g:4.32 g (0.06 mol:0.04 mol:0.24 mol), and then put into an about 100 mL of 2-neck flask. Thereafter, 0.05 mL of ammonia as a catalyst was added to the mixture, and stirred at 60° C. for 72 hours. The mixture was filtered using a 0.45 μm Teflon filter, thereby obtaining an epoxy-siloxane resin. The degree of condensation of the epoxy-siloxane resin was calculated using $^{29}Si$-NMR analysis. It was confirmed that the epoxy-siloxane resin has a degree of condensation of 85%.

Next, 3-ethyl-3[{(3-ethyloxetane-3-yl)methoxy}methyl]oxetane as a reactive monomer was added in an amount of 10 parts by weight with respect to the resin, and triarylsulfonium hexafluoroantimonate salts, mixed 50% in propylene carbonate (Sigma-Aldrich) as a polymerization initiator for photo-polymerization was added in an amount of 2 parts by weight with respect to the resin. Then, as antioxidants to prevent oxidation of the polymeric species, iso-octyl-3-(3,5-di-tert-butyl-4-hydroxyphenyl)propionate and tris(nonylphenyl)phosphite were added in amounts of 1.35 parts by weight and 3.6 parts by weight, respectively, with respect to the resultant resin, thereby obtaining a siloxane hard-coating resin composition.

The siloxane hard-coating resin composition was coated on the surface of 50 μm thick PET films in thicknesses of 1 μm, and then exposed to a UV lamp (20 mW/cm² at 365 nm) for 1 minute for photocuring. After photocuring was completely finished, humid annealing was performed at a temperature of 85° C./85% RH for 1 hour, thereby producing a siloxane cured hard-coating article.

In order to measure the surface hardness of the cured hard-coating films obtained in the examples and the comparative examples, a pencil hardness tester according to KS M ISO 15184 was used with a constant applied load of 750 gf. The results are shown in the following Table 1. In addition, flexibility of the cured hard-coating films obtained in the examples and the comparative examples was evaluated using a dynamic folding tester (Model: DLDMLH-FS, Maker: YUASA SYSTEM Co., Ltd.). The tension free U-shape folding test with a radius of curvature (folding radius) of 1 mm was sequentially repeated 10, 100, 1,000, 10,000 and 100,000 times with the coating layers on the outside (Outward folding). Whether or not the films pass through the test was determined depending on whether a crack occurs or not. The results are shown in the following Table 1 with symbols 0 (no occurrence of crack) and X (occurrence of crack).

TABLE 1

| | Pencil hardness | Folding test | | | | |
| --- | --- | --- | --- | --- | --- | --- |
| | | 10 | 100 | 1,000 | 10,000 | 100,000 |
| Bare PET film | <6B | ◯ | ◯ | ◯ | ◯ | ◯ |
| Example 1 | H | ◯ | ◯ | ◯ | ◯ | ◯ |
| Example 2 | F | ◯ | ◯ | ◯ | ◯ | ◯ |
| Example 3 | F | ◯ | ◯ | ◯ | ◯ | ◯ |
| Example 4 | H | ◯ | ◯ | ◯ | ◯ | ◯ |
| Example 5 | F | ◯ | ◯ | ◯ | ◯ | ◯ |
| Example 6 | H | ◯ | ◯ | ◯ | ◯ | ◯ |
| Example 7 | H | ◯ | ◯ | ◯ | ◯ | X |
| Example 8 | H | ◯ | ◯ | ◯ | ◯ | ◯ |
| Example 9 | H | ◯ | ◯ | ◯ | ◯ | X |
| Example 10 | F | ◯ | ◯ | ◯ | ◯ | X |
| Example 11 | H | ◯ | ◯ | ◯ | ◯ | ◯ |
| Example 12 | H | ◯ | ◯ | ◯ | ◯ | X |
| Comparative example 1 | 3B | ◯ | ◯ | ◯ | ◯ | ◯ |
| Comparative example 2 | 2B | ◯ | ◯ | ◯ | ◯ | ◯ |
| Comparative example 3 | HB | ◯ | X | | | |
| Comparative example 4 | H | X | | | | |
| Comparative example 5 | H | ◯ | X | | | |

As shown in Table 1, it was confirmed that the cured hard-coating films produced according to embodiments of the present invention (Example 1 to 12) exhibit the high surface hardness (a pencil hardness of F or H) and the excellent outward foldability (a radius of curvature of 1 mm, >10,000 times), simultaneously.

Specifically, the cured hard-coating films which were not produced according to embodiments of the present invention (Comparative example 1 to 5) obviously exhibit poorer surface hardness or lower outward foldability than the cured hard-coating films produced according to embodiments of the present invention (Example 1 to 12).

As shown above, the hard-coating resin composition of the present disclosure can be used for cured hard-coating article having good hardness with flexibility under inward and outward bending conditions, which makes the hard-coating resin composition very useful for applying it to various flexible devices or displays.

When the hard-coating resin composition according to embodiments of the present invention is coated on flexible films and cured using the method according to embodiments of the present invention, the cured hard-coating films show high surface hardness, scratch resistance and flexibility (specifically, outward foldability), simultaneously. Therefore, the hard-coating resin composition according to embodiments of the present invention can be used as flexible hard-coating s of flexible cover window films for flexible optoelectronics (such as foldable, wearable displays).

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A hard-coating resin composition comprising a siloxane resin including an epoxy group, wherein the siloxane resin is prepared by hydrolysis and/or condensation of
   (i) a silane represented by the following Chemical Formula 1 including an epoxy group, or
   (ii) the silane represented by the following Chemical Formula 1 including an epoxy group and at least one selected from the group consisting of a silane represented by the following Chemical Formula 2, a silane represented by the following Chemical Formula 3 and a silane represented by the following Chemical Formula 4 in the presence of a catalyst:

$R^1R^2Si(OR^3)_2$      [Chemical Formula 1]

$R^4R^5Si(OR^6)_2$      [Chemical Formula 2]

$R^7Si(OR^8)_3$      [Chemical Formula 3]

$Si(OR^9)_4$;      [Chemical Formula 4]

wherein
   $R^1$ is a straight or branched $C_1$ to $C_6$ alkyl group including an epoxy group,
   $R^2$, $R^4$, $R^5$, and $R^7$ are independently selected from the group consisting of a straight or branched $C_1$ to $C_6$ alkyl group including an epoxy group, a $C_1$ to $C_{20}$ alkyl group, a $C_3$ to $C_8$ cycloalkyl group, a $C_2$ to $C_{20}$ alkenyl group, a $C_2$ to $C_{20}$ alkynyl group, a $C_6$ to $C_{20}$ aryl group, an acryl group, a methacryl group, a halogen group, an amino group, a mercapto group, an ether group, an ester group, a carbonyl group, a carboxyl group, a vinyl group, a nitro group, a sulfone group, an alkyd group, a hydroxyl group, an imide group, a fluorine group, and an UV absorbing group,
   $R^3$, $R^6$, $R^8$, and $R^9$ are independently hydrogen or a straight or branched $C_1$ to $C_7$ alkyl group; and
   wherein a mole ratio of the silane represented by Chemical Formula 1 to the total silanes is in the range of from 0.6 to 1, a mole ratio of the silane represented by Chemical Formula 2 to the total silanes is in the range of from 0 to 0.4, a mole ratio of the silane represented by Chemical Formula 3 to the total silanes is in the range of from 0 to 0.3 and a mole ratio of the silane represented by Chemical Formula 4 to the total silanes is in the range of from 0 to 0.2,
   wherein degree of the condensation of the silanes is more than 60%.

2. The hard-coating resin composition of claim 1, wherein the silane represented by Chemical Formula 1 includes one or more selected from the group consisting of (3,4-epoxycyclohexyl)ethyldimethoxysilane, 2-(3,4-epoxycyclohexyl)ethyl(methyl)dimethoxysilane, (3,4-epoxycyclohexyl)ethyldiethoxysilane, 2-(3,4-epoxycyclohexyl)ethyl(methyl)diethoxysilane, (2-(7-oxabicyclo[4.1.0]heptan-3-yl)ethyl)(methyl)silanediol, dimethoxy(methyl)(3-(oxiran-2-yl)propyl)silane, diethoxy(methyl)(3-(oxiran-2-yl)propyl)silane, methyl(3-(oxiran-2-yl)propyl)silanediol, (3-glycidoxypropyl)dimethoxymethylsilane, (3-glycidoxypropyl)diethoxymethylsilane, and (3-glycidoxypropyl)methylsilanediol.

3. The hard-coating resin composition of claim 1, wherein the catalyst is selected from the group consisting of an acidic catalyst, a basic catalyst, an ion exchange resin, and combinations thereof.

4. The hard-coating resin composition of claim 3, wherein the catalyst is selected from the group consisting of hydrochloric acid, acetic acid, hydrogen fluoride, nitric acid, sulfuric acid, chlorosulfonic acid, iodic acid, pyrophosphoric acid, ammonia, potassium hydroxide, potassium carbonate, sodium sodium hydroxide, barium hydroxide, imidazole, an ion exchange resin, and combinations thereof.

5. The hard-coating resin composition of claim 1, further comprising a reactive monomer including at least one of an epoxy group or oxetane group.

6. The hard-coating resin composition of claim 1, further comprising a polymerization initiator selected from the group consisting of an onium salt, an organometallic salt, an amine, an imidazole, and combinations thereof,
   wherein an amount of the polymerization initiator in the range of from 0.1 to 10 parts by weight with respect to 100 parts by weight of the siloxane resin.

7. The hard-coating resin composition of claim 1, further comprising at least one additives selected from the group consisting of an organic solvent, an antioxidant, a leveling agent, an UV absorber, a hindered amine light stabilizer, and a flow control agent.

8. A method of preparing a cured hard-coating article, comprising a polymerization of the hard-coating resin composition of claim 1.

9. The method of preparing the cured hard-coating article of claim 8, wherein the polymerization includes irradiating light, heating, or humid-annealing.

10. A cured hard-coating article, comprising a cured article which is prepared by a polymerization of the hard-coating resin composition of claim 1.

11. An optical film, comprising the cured hard-coating article of claim 10.

12. The optical film of claim 11, wherein the film is in a form of sheet.

13. A device, comprising the optical film according to claim 11.

14. The device of claim 13, wherein the device includes a display unit.

* * * * *